United States Patent [19]
Silen et al.

[11] Patent Number: 6,049,871
[45] Date of Patent: Apr. 11, 2000

[54] METHOD AND APPARATUS FOR DISPLAY CONTROL BOOTUP

[75] Inventors: Bradley A. Silen, Sausalito; Lorenzo Cotton, Tracy; Mark D. Moore, Palo Alto, all of Calif.

[73] Assignee: Compaq Corporation Corporation, Houston, Tex.

[21] Appl. No.: 08/866,393

[22] Filed: May 30, 1997

[51] Int. Cl.[7] .................................................. G06F 9/44
[52] U.S. Cl. .................................................. 713/2; 713/200
[58] Field of Search .................................. 713/2, 200, 1, 713/100; 395/651, 652, 653, 186

[56] References Cited

U.S. PATENT DOCUMENTS

| | | | |
|---|---|---|---|
| 5,600,766 | 2/1997 | Deckys et al. | 395/135 |
| 5,754,798 | 5/1998 | Uehara et al. | 395/284 |
| 5,774,652 | 6/1998 | Smith | 713/200 |
| 5,809,230 | 9/1998 | Pereira | 713/200 |

*Primary Examiner*—Dennis M. Butler
*Attorney, Agent, or Firm*—Jenkens & Gilchrist

[57] ABSTRACT

A computer system includes a display control apparatus for preventing the display of certain characters during the bootup sequence prior to transfer of control to an operating system. The control may be instituted without significantly augmenting the basic input/output system memory requirements using a terminate and stay resident driver to cause certain interrupts which would otherwise result in screen displays to cache the screen display characters. The screen display characters maybe displayed upon user command if elected. The computer system is sensitive to a variety of conditions which require restoration of the screen display including situations which require user key input and the failure of the operating system to initiate within a certain period of time.

19 Claims, 3 Drawing Sheets

METHOD AND APPARATUS FOR DISPLAY CONTROL BOOTUP

BACKGROUND OF THE INVENTION

This invention relates generally to booting a computer system.

Modern personal computers typically include a set of built-in software routines called the basic input/output system or "BIOS." The BIOS controls many important functions of the personal computer such as how it interprets key strokes, how it puts characters on the screen, and how it communicates with other devices.

The BIOS typically instructs the computer to test itself every time the user turns it on. To do this, the BIOS uses a power on self test ("POST").

When a personal computer starts, it typically first enters what is called "real mode". The computer accesses a special memory location holding program instructions including a jump instruction pointing to the BIOS code. Initially, the BIOS instructs the system microprocessor to run through all the known components of the system and to determine whether they are operating properly. Next, any expansion boards which have been installed are checked, and thereafter, the microprocessor begins the actual bootup process. During the bootup process, the BIOS code instructs the microprocessor to jump to a section of code instructing the microprocessor how to read the first sector of the system floppy, hard disk drive, or CD-ROM drive. The microprocessor then loads the operating system from the disk to start actual computer operations.

Once the operating system has been loaded and is operating, the BIOS may continue to contribute to the operation of the computer. It may do this through routines that programs can access to facilitate commonplace computer functions, such as reading key strokes, timing events or putting characters on a screen. Through the use of such BIOS routines, programmers can create complex programs without being concerned about these underlying functions.

In Windows®-based computer operating systems, the Windows® operating system starts only after a DOS boot sequence is completed. There is typically a time lag between when the user turns the computer on and the time when the Windows® program takes over.

During this DOS/Windows® booting sequence, an attached monitor will typically display information concerning the booting sequence, and then indicate (through a Windows® "splash screen") when the Windows® operating system is loading.

SUMMARY OF THE INVENTION

In accordance with one aspect of the present invention, a method for booting a computer system involves initiating a machine boot program. The machine boot program is altered to prevent a certain screen display.

The method may also include the step of loading a driver into memory and hooking the driver onto an interrupt vector table. The driver loading may be terminated at some point in time. The driver may be maintained in the interrupt vector table. One type of driver which is useful as the driver in this method is a DOS device driver.

Other variations may involve trapping outputs that would cause characters on the screen to be displayed prior to the time when the operating system is executed. Information may be stored corresponding to the prevented screen displays. The information corresponding to the prevented screen displays may be displayed upon request.

A variety of interrupts may be detected to facilitate control of the bootup display. For example, the terminating step may include the step of detecting an interrupt which occurs when the operating system, such as Windows®, completes initialization. Similarly, the method can include the step of pausing the interrupting step when a boot program requests a user key input.

In accordance with still other aspects of the present invention, a method may include the step of determining the time between the interrupting step and time when an operating system completes initialization. The interrupting step may be terminated if a predetermined time period is exceeded after the interrupting step begins without execution of the operating system program.

In accordance with another aspect of the present invention, a computer system includes a central processing unit and a storage device, communicable with the central processing unit. The storage device may contain a basic input/output system. A display control device is adapted to prevent display of screen characters by the basic input/output system.

The display control device may include a DOS device driver. In addition, a timer may be provided for timing the amount of time before an operating system begins operation in the computer system. The system may also include an apparatus for terminating the operation of the display control device when a given period of time has passed.

The display control device may include an element which terminates the operation of the display control device when it is necessary to receive a key input from the user. A mechanism may store the screen characters that are not displayed as a result of the operation of the display control device.

The storage device may be a read only memory, and the computer system may further include a system memory. The basic input/output system may be stored in the read only memory such that the basic input/output system may be shadowed in said system memory. The screen characters are then stored in the system memory. A device is adapted to automatically display the screen characters in response to a user input.

Among the advantages of the invention is the ability to control the bootup display screen. This means that one can control the graphics which are displayed prior to the time when the operating system is fully initialized. This would allow one to display graphics which are advantageous, for example, to a computer manufacturer, such as information about the computer manufacturer, instead of the default bootup display. In addition, the ability to control the bootup display screen enables the user to eliminate some of the information which is currently displayed which may be meaningless or irritating to some users. Some embodiments of the system may provide the ability to cache the information which would otherwise have been displayed. The user can then selectively display the cached bootup display information, as desired. The system also advantageously allows the output generated by the bootup program to be displayed. There are a variety of instances when this would be desirable. For example, display may be returned when a user's key input is necessary. Similarly, control over the computer display screen may be terminated when the operating system is not initialized after a given period of time. Under such circumstances, a variety of problems may have arisen which the computer user may have no way to diagnose without the display information.

Other advantages will become apparent from the following description and from the claims.

DESCRIPTION OF THE PREFERRED EMBODIMENT

Figure 1:
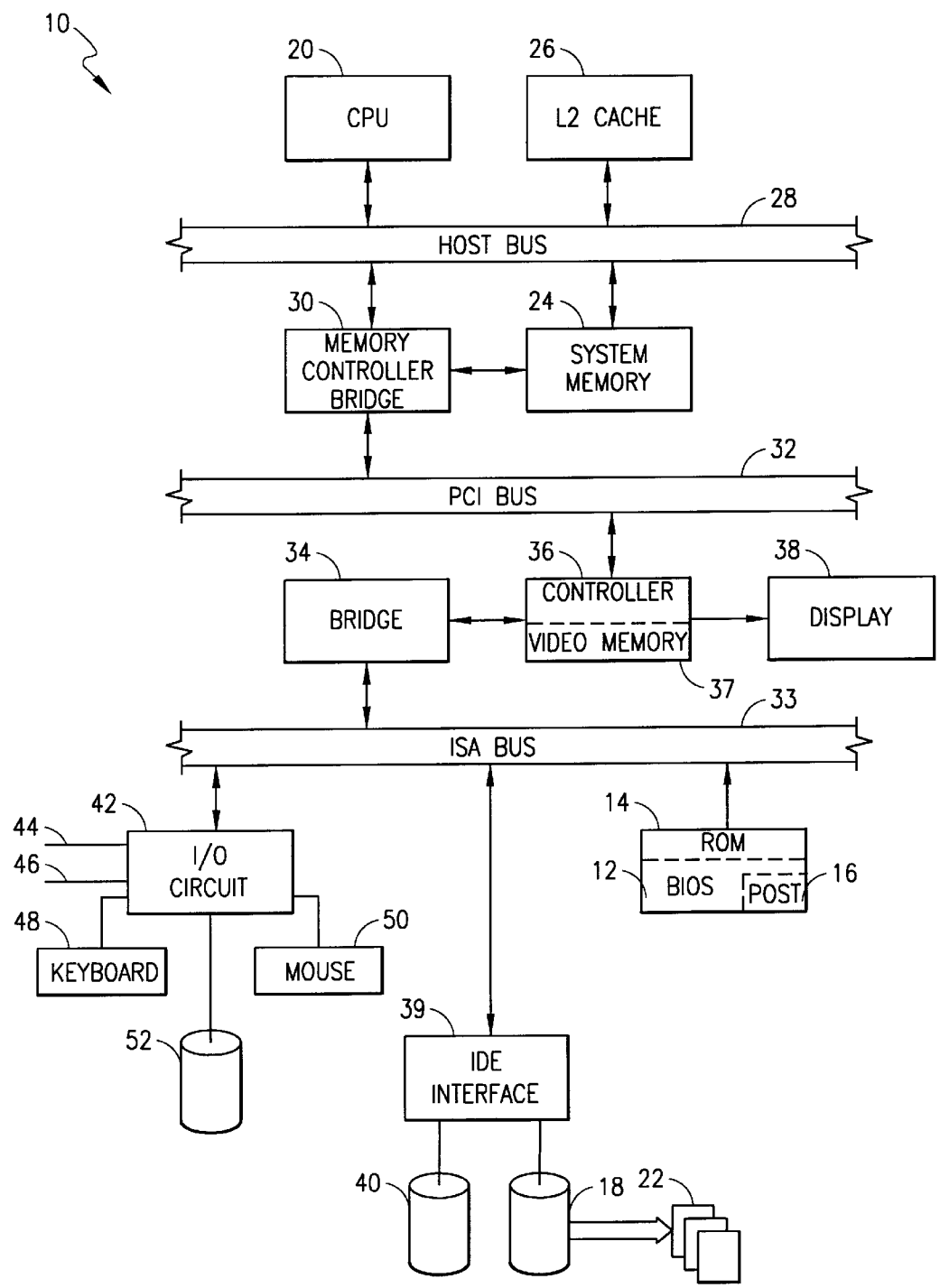
FIG. 1 is an exemplary schematic of a computer system.

As shown in FIG. 1, a computer system 10 has a collection of firmware programs often called a basic input/output system (BIOS) 12. Typically, BIOS 12 includes a subgroup of programs known as the power on self test program (POST) 16. BIOS 12 may be stored in read only memory (ROM) 14. However, unlike typical computer systems, the POST 16 may be expanded to include routines stored outside ROM 14 on hard disk drive 18.

Executing a portion of POST program 16, central processing unit (CPU) 20 determines which routines 22 from hard disk 18 are needed by other parts of POST program 16, and transfers these routines 22 to a system memory 24 where routines 22 may be executed. Routines 22 may be accompanied in system memory 24 by a "shadowed" copy of BIOS 12. Because CPU 20 can execute code faster from system memory 24 than from ROM 16, in a technique called "shadowing", CPU 20, during the initial stages of POST program 16, transfers a copy of BIOS 12 to system memory 24 where BIOS 12 is thereafter executed.

Computer system 10 may include a level two (L2) cache 26 coupled to a host bus 28, along with CPU 20. Also coupled to host bus 28 are system memory 24 and system memory controller/host bridge 30. Computer system 10 may include a peripheral component interconnect (PCI) bus 32 which may be interfaced to an industry standard architecture (ISA) bus 33 via a PCI-ISA bridge 34. Also coupled to PCI bus 32 is a display controller 36 which controls display 38. Video memory 37 may be included with display controller 36. ROM 16 is coupled to ISA bus 32, along with an intelligent device electronics (IDE) interface 39, which may control hard disk drive 18 and CD-ROM drive 40.

Computer system 10 may further include an input/output circuit 42 which can provide a parallel port 44 and a serial port 46. The input/output circuit 42 can also receive inputs from a keyboard 48 and a mouse 50. I/O circuit 42 also interfaces a floppy disk drive 54 to computer system 10.

When computer system 10 is first turned on, control of the system is governed by POST program 14. POST program 14 detects and checks all devices in the computer system. At the completion of POST program 14, control of computer system 10 is typically transferred to an operating system such as the Windows® software, which is loaded from hard disk drive 18.

To direct BIOS 12 to the location of the operating system, a boot record is stored in a predetermined location on hard disk drive 18. The boot record contains a partition table identifying the location and size of partitions of hard disk drive 18. One of these partitions contains a boot sector, which has program code for transferring the operating system from the hard drive to system memory 24. Besides the partition table, the boot record also includes program code for checking the integrity of the partition table and loading the boot sector into system memory 24.

In order to control display 38 during the bootup process, while the BIOS is in control of the system, bootup display driver 54 (an MS-DOS device driver) operating in the real mode can be used. This driver can be considered akin to a terminate and stay resident ("TSR") driver which loads as a device driver. Bootup display driver 54 is a bundle of code that implements a series of operations and then terminates. It includes a nonresident section 56 and a resident section 58. Nonresident section 56 has the code to load and set up the bootup display program. It checks to see if the program has been installed, and sets up any configuration information, redirects interrupts and then exits, leaving the code resident. The resident section 58 checks for activation, and executes routines if activated. Bootup display driver 54 uses the lowest available memory. After it has been used, the resident section 58 stays resident in memory. Additional information about terminate and stay resident drivers can be found in "Write TSRs Now" by Jim Ras, published by Wordware Publishing, Inc., incorporated by reference. But it should be noted that while TSRs are loaded and executed by command.com, which processes Autoexec.bat, MS-DOS device drivers are loaded from Config.sys before command.com starts processing the Autoexec.bat file. Thus, DOS device drivers of the type used herein are not, strictly speaking, considered TSRs.

Bootup display driver 54 may be loaded from disk drive 18 under command from Config.sys into system memory 24. Once loaded, the nonresident loader portion 56 of bootup display driver 54 is terminated. Next, the driver hooks its resident section 58 onto an interrupt in an interrupt vector table located in system memory 24. The interrupt handling routines in resident section 58 stay resident even after the non-resident section 56 has been terminated. Bootup display driver 54 can be reactivated thereafter.

As explained in more detail below, when bootup driver 54 sees certain interrupts it takes control. When one of these particular interrupts occurs, computer system 10 locates the appropriate routine to handle the interrupt, typically by multiplying the interrupt number for that interrupt by four and using the result as an address to the interrupt vector table stored in system memory. Each address in the vector table typically points to a BIOS routine that handles the corresponding interrupt. When one of the particular bootup display interrupts occurs, the bootup display driver 54 can be activated once it has been hooked onto that particular interrupt.

For example, if hooked into BIOS interrupt 10, and that interrupt is detected, bootup display driver 54 traps all attempts to display characters onto display 38. These characters are stored instead in a display cache 59 in system memory 24. In this way, the bootup characters are prevented from being displayed on the screen. At the same time, the bootup characters can be restored and viewed if desired, for example, if a user wishes to see the character information which occurs during the bootup process. In addition, if certain problems arise, the system operator may get useful information from the bootup display. By employing a predetermined key sequence on keyboard 48, the boot characters, stored in display cache 59, can be displayed on display 38.

Thus, bootup display driver 54 hooks onto bootup interrupts and wrests certain controls from BIOS 12 without requiring any significant alteration of the BIOS program itself. By hooking bootup display driver 54 into the interrupt vector table, BIOS 12 responds in its usual fashion, but a different display result occurs. For example, an interrupt which normally corresponds to an error condition can be used by bootup display driver 54, hooked into the particular space in the interrupt vector table occupied by that interrupt, to, in effect, silence BIOS program 12, by storing its bootup display characters in display cache 59 instead of displaying them on display 38.

Thus, bootup display driver 54 can take control of bootup execution during certain interrupt conditions, creating different effects from those originally programmed in BIOS 12. However, bootup display driver 54 should also obey certain responsibilities. For example, if another piece of code has been hooked into the interrupt vector table before bootup display driver 54 inserts itself into the table, bootup display driver 54 should take the address of the replaced code in order to pass execution onto the prior inserted code. Otherwise, the start up sequence could end improperly with bootup display driver 54.

Another responsibility of bootup display driver 54 is that once bootup display driver 54 has been inserted into the interrupt vector table, bootup display driver 54 should not remove itself. This is because other code might insert itself into the interrupt vector table as well, after bootup display driver 54 has been inserted. This new code may become dependent upon the presence of bootup display driver 54 code and without it might generate an error condition. Thus, when it is no longer necessary for bootup display driver 54 to operate, it may be advantageous to bypass bootup display driver 54 with a flag.

To successfully control the screen display, bootup display driver 54 should handle a series of conventional interrupts that support the operation of the system. For example, in a Windows® operating system embodiment, control should be transferred to the Windows® operating system when Windows® launches (e.g., with the issuance of interrupt 2F). Once Windows® launches, the bootup information is no longer relevant and control of the bootup information is superfluous. Therefore, bootup display driver 54 recognizes interrupt 2F and ceases operations, allowing Windows® (or another operating system) to control the screen display.

Conventional interrupts may also need to be recognized when a program asks the user to log in and bootup display driver 54 should then trap BIOS keyboard interrupt 16. Suppression of the conventional screen display can then be paused so that necessary information can be displayed to prompt the user to input necessary information. For example, when a user leaves a floppy disk in the floppy disk drive when starting the Windows® program, an interrupt reports that the inserted floppy disk is not the boot floppy disk, and requests that the boot floppy disk be inserted and a key struck, or else the program will not continue. In order to prompt the user to comply, this information should be provided via display 38 in response to the appropriate interrupt during the bootup process.

Although the screen display can be controlled in any number of system configurations, sometimes display control may be undesirable. For example, if something goes wrong during the bootup process, the user may never be able to determine that a problem has arisen if the normal screen display has been cached instead of displayed. As a failsafe default, a timed "bail out" can, if the operating system is not loaded within a certain amount of time, delete the screen interception operation of bootup display driver 54 and allow normal screen display. For example, if a given amount of time passes from the time bootup display driver 54 loaded without the Windows® program starting, the cached screen display data may be automatically displayed.

The timer (which may be a "dead man" type timer system) can be implemented by hooking to timer interrupt 1C. A certain number of times per second, a bit is generated for use as a DOS clock. Bootup display driver 54 interrupts 1C to count the time elapsed, and when the time exceeds a preset amount of time (e.g., 90 seconds), it terminates display interception so that the display screen information stored in display cache 59 may be displayed allowing the user to find out what has gone wrong.

Bootup display driver 54 is loaded by the Config.sys program, preferably before anything else. Thus, it blanks display 38 before the other drivers start displaying information. However, some users may find it desirable to load another driver first.

Cached display screen data may be displayed when a predetermined key sequence is used during the bootup process. The cached display information is then transferred to display 38 so that the user can consider the information. Bootup display driver 54 recognizes the predetermined sequence key actuation, retrieves the cached display information from system memory 24, and displays it on display 38. After computer system 10 shuts down, the data cached in system memory is disposed.

In some implementations it may be desirable to make the display screen absolutely black during bootup. This may be done by a call to the video controller 36 to turn off its video output. After bootup display driver 54 terminates and cedes control to the operating system, video controller 36 can be turned back on automatically. Use of this technique can insure that legacy devices do not address video memory 37 and display information on display 38, regardless of the operation of bootup display driver 54. Another option is to fill a video display buffer with information corresponding to a completely black screen and to load that information into video controller 36.

Another technique for taking control of the display screen during the bootup process is to use an extension to the bootup process. Such an extension can be contained in the BIOS; however, in many systems, there is little available room in the BIOS and additional usage is undesirable. In such cases, the necessary code can be stored in a hard drive 18 and accessed as an extension to POST program 16. Techniques for accomplishing this are disclosed in U.S. patent application Ser. No. 08/778,391, titled "Expanding Firmware," filed in the names of Mark J. Altendorf, et al. on Dec. 31, 1996, incorporated by reference.

The operating system splash screen can also be intercepted. The splash screen is an initially-displayed screen typically showing the name of the operating system. By intercepting the splash screen, a computer manufacturer, for example, can control the screen display up to and including the point when the operating system is actually running. In Windows® applications, the splash screen may be blanked by setting the boot delay equal to zero and the boot GUI equal to one in msdos.sys. It is also possible to alter logo.sys in Windows® which is the bit map file for the logo. The logo.sys bit map file may be replaced with an empty file or with another desired display.

Figure 2:
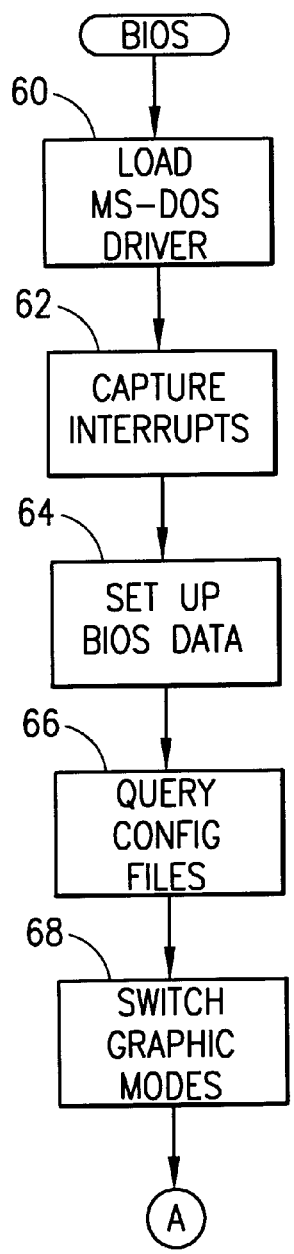
FIG. 2 is a flow chart showing a booting display method.

Referring to FIG. 2, a bootup display method begins with the initiation of BIOS 12. An MS-DOS device driver is then loaded (step 60). Bootup display driver 54 captures a series of BIOS and DOS interrupts to effect the text interception process (step 61). The pertinent interrupts can include BIOS interrupts 10, 1C, 16, and 9, and DOS interrupts 21 and 2F. Interrupt 10 is the BIOS video interrupt used to prevent text screen writes to the display screen. Interrupt 1C is a BIOS timer interrupt which may be used to time animated graphics or to implement a failure mode timeout. Interrupt 16 is a BIOS keyboard interrupt useful in monitoring user keyboard activity, and to exit the bootup display accordingly. Interrupt 9 is a BIOS keyboard controller interrupt which catches interrupts possibly missed by interrupt 16. Interrupt 21 is a DOS interrupt used to monitor other programs/drivers' attempts to read the keyboard. Interrupt 2F is a DOS interrupt used to monitor the Windows® initialization. Additional information about BIOS and DOS interrupts can be found in a number of sources such as the "PC Programmer's Guide to Low-Level Functions and Interrupts" by Marcus Johnson, published by SAMS Publishing, incorporated by reference.

Several data locations in the BIOS data area may be modified to conceal the fact that the text screens have been intercepted and cached (step 64). Specifically, these data locations may be changed to reflect standard VGA, color capable, text mode.

Next, the configuration files are queried (step 66), by opening and parsing two configuration files. The graphics modes in the bootup display method may conflict with the default Windows® bootup splash screen. The presence and setting of these configuration files prevent conflicts from taking place. The graphic modes are switched (step 68) to change the video graphic display mode in preparation for loading the bootup graphics if any, inserted in place of the normal bootup display.

Figure 3:
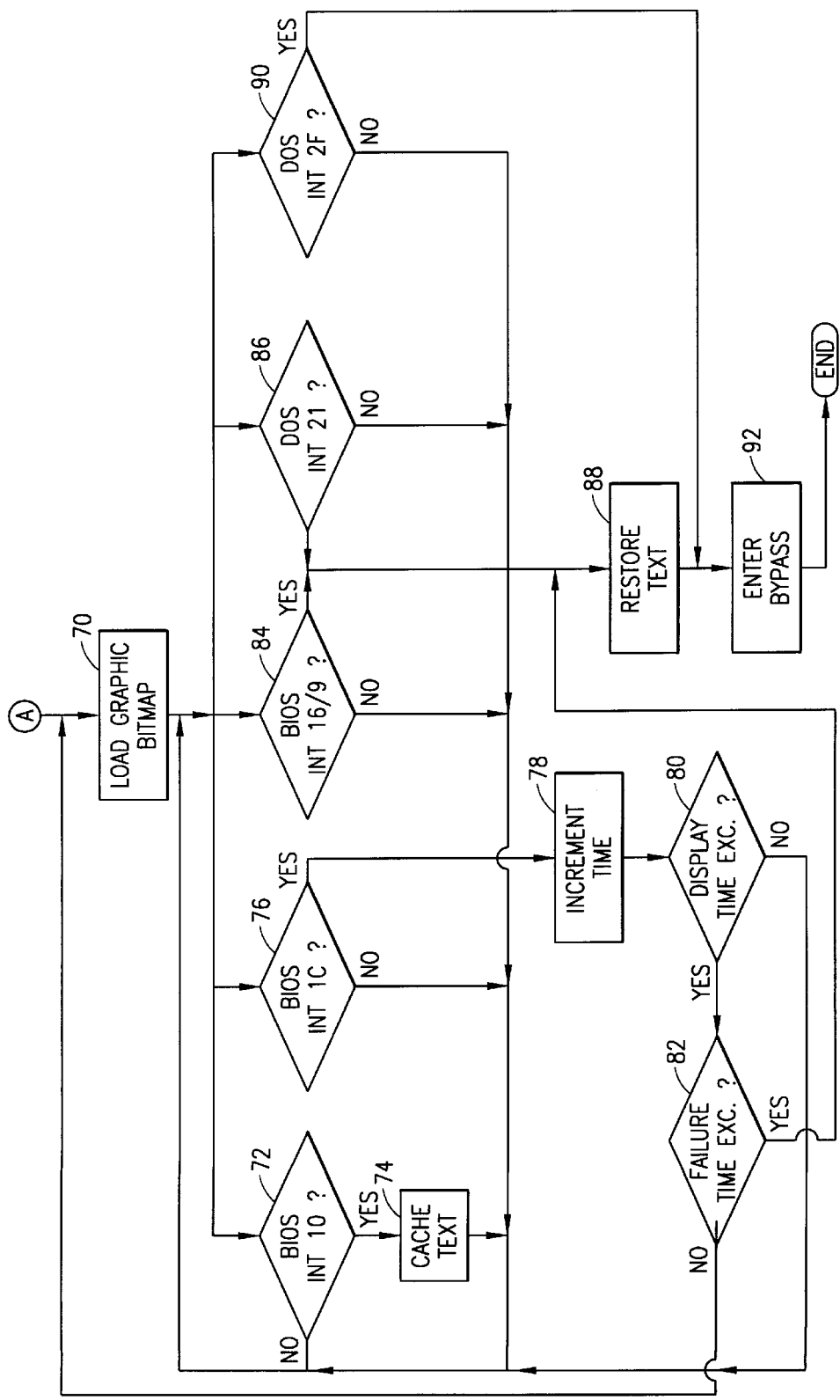
FIG. 3 is a flow chart showing additional functions of a booting display method.

Referring to FIG. 3, a graphic color animation used during the bootup sequence may be loaded (step 70). Timers may be used to manage the loading and color progression display of the inserted graphics. A graphic bit map may be loaded from a hidden partition on hard drive 18 into video memory 37.

A timer estimates the bootup delay of the user's particular system using interrupt 2F. The delay estimate may be saved on hard disk 18 for use in subsequent boot cycles to time the progression of a graphic color animation. The delay estimate is made on each boot cycle and saved.

The text interception process monitors a number of events. For example, BIOS interrupt 10 is monitored (step 72) to prevent text screen writes to the display screen 38. If interrupt 10 is detected, the text data is cached (step 74).

BIOS interrupt 1C is also monitored (step 76). If detected, a timer is incremented (step 78). A check is made to determine whether the display time has been exceeded (steps 80 and 82). This is important when loading graphic information for timing the color progression of a displayed animation. In addition, a check is made (step 82) to determine whether too much time has passed since bootup display driver 54 initially loaded, indicating that something in the booting process has failed. In that case, the text display is restored (step 88). Operation of bootup display driver 54 is then terminated.

Also, interrupts 16 and 9 are checked, since they monitor keyboard activity. If keyboard activity occurs, indicating that the user wants the suppressed display information, the information is restored (step 88) and a bypass of normal bootup display driver 54 operation occurs.

Also, interrupt 21 is detected (step 86). If so, the suppressed display information is restored for the same reason discussed above.

Finally, a check is made to determine whether the Windows® initialization has begun (step 90). If so, the bootup display driver 54 proceeds to terminate (step 92).

Bypass mode (step 92) involves setting all captured interrupt handlers into a bypass mode, which may be accomplished by setting an internal flag variable, where each interrupt handler checks this flag. Each handler does nothing if the bypass flag has been set. Bypass mode (step 92) may be instigated when Windows® begins started initialization and sets interrupt 2F when the user hits the escape key, by other keyboard activity, or by timeout, as discussed above.

Bootup display driver 54 remains memory resident, since there is usually no practical way to unload an MS-DOS driver after other drivers have subsequently been loaded, because of interrupt linkages. As a result, about 5 k of unusable memory may result, including 2 k of video cache buffer space. However, bootup display driver 54 can be structured to permit most of the initialization routine to relinquish memory space after the driver loader phase is complete. This can result in substantial savings of memory, especially considering the potential size of an initial video graphic animation routine.

As discussed above, screen information sent to video display 38 by interrupt 10 may be intercepted and stored in system memory, for example in a memory buffer. Since a text screen normally holds approximately two kilobytes of information, a relatively small buffer is all that is needed. When the user or other program activity requires termination of bootup display driver 54, it can restore the display graphic mode to text and dump the buffered text to screen (step 88).

Bootup display driver 54 monitors keyboard related interrupt calls (step 84) and counts the density and frequency of such calls. The timer interrupts can be used in the density count. Some programs periodically sample keyboard interrupts to monitor user input activity and any user attempt to abort a process. Bootup display driver 54 can trap and prevent any such infrequent monitoring from erroneously terminating any substituted bootup graphics.

While the present invention has been described with respect to certain embodiments, those skilled in the art will appreciate a number of modifications and variations, the scope of which are limited only by the following claims.

What is claimed is:

1. A method for booting a computer system comprising the steps of:

initiating a machine boot program;

altering said machine boot program to prevent characters generated during execution of said machine boot program from being displayed;

prior to execution of an operating system controlling said computer system, trapping characters for display; and returning to execution of said machine boot program.

2. The method of claim 1, further comprising the step of:

responsive to the step of altering said machine bootup program, storing information corresponding to said characters generated during execution of said machine boot program.

3. The method of claim 2, further comprising the steps of:

retrieving said stored information corresponding to said characters generated during execution of said machine boot program; and displaying information corresponding to said characters upon request.

4. The method of claim 1, further comprising the step of terminating the altering of said machine boot program when an operating system begins execution.

5. The method of claim 4, wherein said operating system comprises a Windows® operating system.

6. A method of claim 4, wherein said terminating step includes the step of detecting an interrupt which occurs when the operating system begins execution.

7. The method of claim 4, further comprising the step of determining the time between said detecting an interrupt step and the time when the operating system begins execution.

8. The method of claim 7, further comprising the step of terminating said interrupting step when a predetermined time period is exceeded after said interrupting step begin without execution of said operating system.

9. The method of claim 1, further comprising the step of pausing the altering when the boot program requests a user key input.

10. A computer system comprising:

a central processing unit;

a display connected to said central processing unit;

a storage device adapted to communicate with said central processing unit, said storage device containing a basic input/output system; and a display control device adapted to prevent display of screen characters by said basic input/output system prior to execution of an operating system associated with said central processing unit.

11. The computer system of claim 10, wherein said display control device includes a DOS device driver.

12. The computer system of claim 10, further comprising a timer for timing the amount of time before an operating system begins operation in said computer system, said computer system including an apparatus for terminating the operation of said display control device when a given period of time has passed before initiation of the operating system.

13. The computer system of claim 10, wherein said display control device includes an element which terminates the operation of said display control device when it is necessary to receive a key input from a user.

14. The computer system of claim 10, further comprising a mechanism for storing said screen characters that are not displayed as a result of the operation of said display control device.

15. The computer system of claim 10, wherein said storage device is a read only memory, said computer system further including a system memory, said basic input/output system being stored in said read only memory such that said basic input/output system may be shadowed in said system memory, said screen characters being stored in said system memory, and said computer system further including a device adapted to automatically display said screen characters in response to a user input.

16. A method for controlling a computer display in communication with a computer system, the method comprising the steps of:

initiating a bootup for the computer system;

receiving a character generated during the bootup of the computer system;

preventing the character from being displayed on the computer display; and responsive to receiving the character, storing the character in a storage device.

17. The method of claim 16, further comprising the steps of:

retrieving the character stored in the storage device;

receiving an indication of an error condition; and responsive to receiving the indication of the error condition, displaying the retrieved character on the computer display.

18. The method of claim 16, further comprising the step of:

generating the indication of the error condition responsive to an operating system of the computer system not initializing within a particular amount of time after initiating the bootup.

19. The method of claim 16, further comprising the step of:

transferring control of the computer display to an operating system of the computer system;

wherein the transfer is subsequent to the step of storing the character in the storage device.

* * * * *